United States Patent
Krishnamurthy et al.

(10) Patent No.: US 12,345,915 B1
(45) Date of Patent: Jul. 1, 2025

(54) HETEROGENEOUS INTEGRATION OF ACTIVE LAYERS ON A HEAT-ASSISTED MAGNETIC RECORDING SLIDER

(71) Applicant: Seagate Technology LLC, Fremont, CA (US)

(72) Inventors: Vivek Krishnamurthy, Eden Prairie, MN (US); Scott Eugene Olson, Eagan, MN (US); Jiaoming Qiu, Maple Grove, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 319 days.

(21) Appl. No.: 17/809,470

(22) Filed: Jun. 28, 2022

(51) Int. Cl.
| | |
|---|---|
| G02B 6/14 | (2006.01) |
| G02B 6/10 | (2006.01) |
| G11B 5/00 | (2006.01) |
| G11B 5/31 | (2006.01) |

(52) U.S. Cl.
CPC ............ G02B 6/10 (2013.01); G02B 6/14 (2013.01); *G11B 2005/0021* (2013.01); *G11B 5/314* (2013.01)

(58) Field of Classification Search
CPC ....................................................... G02B 6/14
USPC .......................................................... 385/14
See application file for complete search history.

(56) References Cited

U.S. PATENT DOCUMENTS

| | | | |
|---|---|---|---|
| 8,179,747 B1* | 5/2012 | Mugino | G11B 5/6088 360/59 |
| 9,053,717 B1* | 6/2015 | Matsumoto | G11B 5/314 |
| 9,536,788 B1* | 1/2017 | Ning | H01L 29/66265 |
| 2008/0013912 A1* | 1/2008 | Shukh | G02B 6/12002 385/147 |
| 2011/0274130 A1* | 11/2011 | Abeles | H01S 5/04257 372/45.01 |
| 2012/0048609 A1* | 3/2012 | Ohnuki | H05K 1/184 216/13 |
| 2012/0099407 A1* | 4/2012 | Hipwell | G11B 5/314 216/13 |
| 2013/0229729 A1* | 9/2013 | Yamazaki | G11B 5/4853 360/244.2 |
| 2015/0249321 A1* | 9/2015 | Chen | G02B 6/34 372/45.01 |
| 2017/0168235 A1* | 6/2017 | Zhang | G02B 6/4257 |
| 2018/0259708 A1* | 9/2018 | Huangfu | H01L 29/20 |
| 2021/0088727 A1* | 3/2021 | Park | H01S 5/1064 |
| 2023/0268714 A1* | 8/2023 | Morrison | H01S 5/2031 372/43.01 |

OTHER PUBLICATIONS

Tran, et al.; "Extending the spectrum of fully integrated photonics"; physics.optics; Dec. 10, 2021; pp. 1-10; California, USA.

(Continued)

*Primary Examiner* — Kaveh C Kianni

(57) ABSTRACT

A hard disk drive (HDD) includes a heat-assisted magnetic recording (HAMR) head. The HAMR head includes one or more features comprising a laser device that is a heterogeneous integrated epitaxial grown GaAS laser. The laser device couples directly with a waveguide that transfers the electromagnetic radiation generated by the laser device to a near field transducer. The device includes an N-doped layer for coupling the output of the GaAs active layer to the waveguide.

10 Claims, 11 Drawing Sheets

(56) References Cited

OTHER PUBLICATIONS

De Beeck, et al.; "Heterogeneous III-V on silicon nitride amplifiers and lasers via microtransfer printing"; Optica; pp. 386-393; May 2020; vol. 7; No. 5; Cork, Ireland.
Pu, et al.; "Heterogeneous Integrated III-V Laser on Thin SOI With Single-Stage Adiabatic Coupler: Device Realization and Performance Analysis"; IEEE Journal of Selected Topics In Quantum Electronics; pp. 1-8; Nov./Dec. 2015; vol. 21; No. 6.
Arefin, et al.; "III-N/Si3N4 Integrated Photonics Platform for Blue Wavelengths"; IEEE Journal of Quantum Electronics; pp. 1-9; Aug. 2020; vol. 56; No. 4.
Vissers, et al.; "Hybrid integrated mode-locked laser diodes with a silicon nitride extended cavity"; Optics Express; pp. 1-10; May 10, 2021; vol. 29; No. 10; Ghent, Belgium.
Zhang, et al.; "III-V-on-Si photonic integrated circuits realized using micro-transfer-printing"; APL Photonics; pp. 1-11; Nov. 4, 2019; vol. 4.
Kakitsuka, et al.; "Lateral Current-injection Membrane Lasers Fabricated on Silicon Substrate"; NTT Technical Review; pp. 1-7; Jan. 2016; vol. 14; No. 1.
De Beeck; et al.; "Heterogeneous III-V on silicon nitride amplifiers and lasers via microtransfer printing"; Optica; https://opg.optica.org/optica/fulltext.cfm?uri=optica-7-5-386&id=431218; pp. 386-393; 2020; vol. 7; Issue 5.

\* cited by examiner

HETEROGENEOUS INTEGRATION OF ACTIVE LAYERS ON A HEAT-ASSISTED MAGNETIC RECORDING SLIDER

TECHNICAL FIELD

The disclosure relates to features of a heat-assisted magnetic recording head of a hard disk drive.

BACKGROUND

Hard disk drives (HDDs) utilize one or more magnetic recording heads fabricated on sliders to write data to and read data from magnetic disks. Data is stored in an HDD in the form of oriented magnetic grains on surfaces of magnetic disks. A magnetic recording head of an HDD may include at least one writer and at least one reader. A writer is configured to generate and direct a magnetic field toward a surface of a magnetic disk to preferably orient magnetic grains on the surface of the magnetic disk to form stored bits of data.

Magnetic recording physics imposes limits on aspects of the HDD recording system in the form of a superparamagnetic limit. Specifically, the superparamagnetic limit requires a balance of media grain size (volume) and grain magnetic anisotropy with thermal energy. Grains on a magnetic disk in which the thermal energy ($k_B T$, where $k_B$ is the Boltzmann constant and T is the temperature of the system) exceeds a threshold which is dependent on the product of the media grain size and grain magnetic anisotropy may be unstable and susceptible to data loss from grain orientation flipping. Modern recording technology development seeks to increase areal density capability (ADC) by enabling smaller bits of thermally stable data to be recorded on magnetic disks. Generally, the use of smaller bits also requires smaller grains in order to maintain signal-to-noise ratio (SNR), and smaller grains in turn require higher magnetic anisotropy to maintain data stability against thermal fluctuations. Heat-assisted magnetic recording (HAMR) is one approach to enabling smaller stable grains to be written. HAMR utilizes electromagnetic energy to heat an area of a high anisotropy magnetic disk and temporarily reduce the magnetic coercivity of grains of the magnetic disk during a write cycle, allowing these grains to more easily be preferably oriented by a field from a magnetic writer. Subsequently to writing the data, the area of the magnetic disk cools and the magnetic coercivity increases again, effectively locking in the preferably oriented state of the grains and leaving them in a thermally stable state.

In addition to including one or more writers and readers, a heat-assisted magnetic recording head (hereafter HAMR head) may further include a light source (e.g., a laser), a light delivery system (e.g., a waveguide), and a near-field transducer (NFT). An NFT is configured to receive electromagnetic energy (e.g., photons) from the light source by way of the light delivery system, excite localized surface plasmons (LSP) on a surface of the NFT, and focus the near-field energy of the LSP distribution on a spot on a surface of a magnetic disk. Localized surface plasmons (LSPs) are generated on the NFT by coupling of the electromagnetic energy from the light delivery system with free electrons of the NFT. The LSP distribution may then condense and localize on an area or feature of the NFT, allowing the near-field of the LSP distribution to be focused on the surface of the magnetic disk. The conversion of incident propagating electromagnetic energy to an evanescent near-field distribution associated with LSPs allows the focused spot on the magnetic disk surface to be much smaller than the limit imposed by the diffraction limit of the associated light source wavelength (e.g., a spot size on the order of 50 nm or less can be achieved with incident electromagnetic waves with a wavelength on the order of 830 nm). In some examples, the focused spot of LSP near-field energy on the surface of the magnetic disk heats the surface and temporarily reduces the coercivity of the magnetic grains of the magnetic disk, allowing a writer to preferably orient more grains of the magnetic disk than a magnetic recording head that does not include an NFT, a light source, and a light delivery system. High temperatures may be generated within regions and features of the HAMR head (e.g., in an NFT) during the HAMR write operation as a result of scattering and other non-plasmonic loss of incident electromagnetic energy from the light source, as well as from thermal energy from the highly localized concentration of LSPs on the NFT.

Certain metals which may be referred to as "plasmonic metals" (e.g., gold, silver) are most suitable for generating LSPs from incident electromagnetic energy due to their material properties such as optical response coefficients (e.g., refractive index and extinction coefficient), electrical permittivity, and free electron density, and these materials are commonly used as for fabricating features of a HAMR head (e.g., NFTs, NFT features such as disks and pegs; miniature solid immersion mirrors; and heat sink structures). However, ideal plasmonic metals may also be susceptible to various defect modes related to thermal instability in the presence of high temperatures generated during the HAMR write operation (e.g., feature recession, deformation, voiding, oxidation, and delamination). Example HAMR heads and their features may suffer from thermal and mechanical degradation from repeated exposure to these elevated temperatures, leading to performance, reliability, and lifetime concerns of the HAMR HDD.

SUMMARY

The present disclosure describes features of a heat-assisted magnetic recording (HAMR) head of a hard disk drive (HDD), the features comprising a waveguide assembly with integrated active layer(s). The assembly includes a waveguide disposed on a read-layer stack, an active layer consisting with an N-doped layer disposed proximal and integrated onto the waveguide, and a near field transducer coupled to the waveguide.

A coupling facet is used to couple the light from active layers to passive waveguide. An optional mode converter and reflector (preferably a Bragg reflector) may be coupled to, or integrated with, the waveguide.

The active layers are epitaxially grown, and are integrated to passive waveguide via adhesive or molecular bonding. The waveguide extends in an axial direction, with the active layer tapered along the axial direction. In some embodiments the tapered region is less than approximately 200 um.

Note that the various features of the present invention described above may be practiced alone or in combination. These and other features of the present invention will be described in more detail below in the detailed description of the invention and in conjunction with the following figures.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

Figure 1:
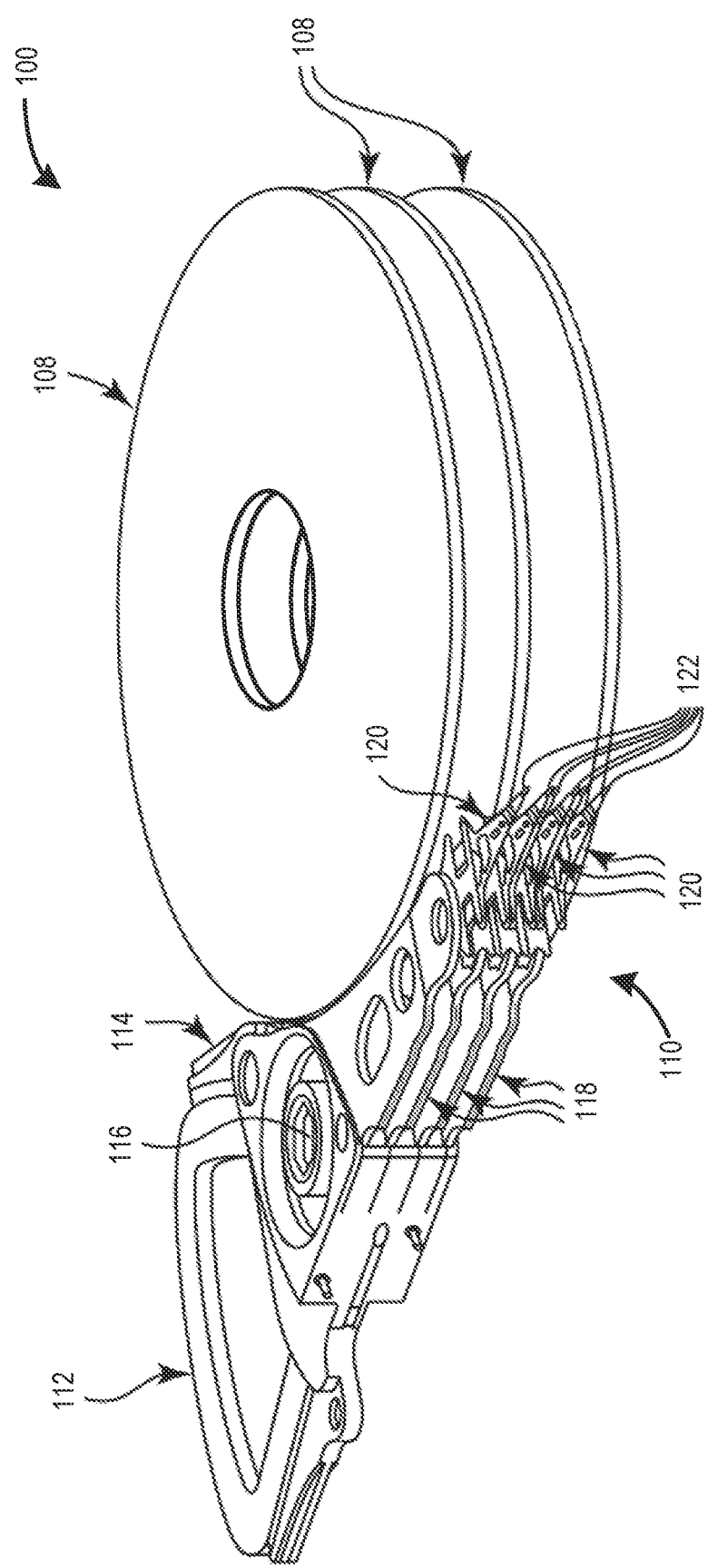
FIG. 1 is a perspective view of an example heat-assisted magnetic recording (HAMR) hard disk drive, in accordance with aspects of this disclosure.

FIG. 1 is a perspective view of an example heat-assisted magnetic recording (HAMR) hard disk drive (HDD), in accordance with aspects of this disclosure. HDD 100 includes a head stack assembly (HSA) 110 and one or more magnetic disks 108. HSA 110 includes a plurality of head gimbal assemblies (HGA) 120. Each HGA 120 includes a slider 122. Each slider 122 includes a heat-assisted magnetic recording (HAMR) head (not shown in FIG. 1).

HSA 110 of FIG. 1 includes a voice coil drive actuator 112. Voice coil drive actuator 112 produces a magnetic field which exerts a force on an actuator mechanism 114, causing actuator mechanism 114 to rotate about a shaft 116 in either rotational direction. Rotatable drive actuator arms 118 are mechanically coupled to actuator mechanism 114 and to each HGA of HGAs 120 such that rotating actuator mechanism 114 causes rotatable drive actuator arms 118 and HGAs 120, and thus sliders 122, to move relative to magnetic disks 108.

Each HAMR head of sliders 122 includes a plurality of active components that are configured to perform or assist in performing drive operations (e.g., read operations, write operations, heating operations). Examples of active components include a writer, a reader, a heater (e.g., a read heater or a write heater), laser, and a near-field transducer (NFT). A drive controller or other suitable control circuitry of HDD 100 (not shown) outputs control signals to direct the respective active components of HAMR heads of sliders 122. In some examples, the active components are configured to activate in response to receiving one or more control signals. In one example, a control signal includes data to be written to one of magnetic disks 108 by a writer of a HAMR head associated with one of sliders 122. In another example, a control signal applies a bias to a reader of a HAMR head associated with one of sliders 122. In another example, a control signal activates a heater of a HAMR head associated with one of sliders 122 prior to and/or during a drive operation. In another example, a control signal directs electromagnetic energy to be sent from a light source of a slider 122 to an NFT of a HAMR head of the slider 122.

Figure 2:
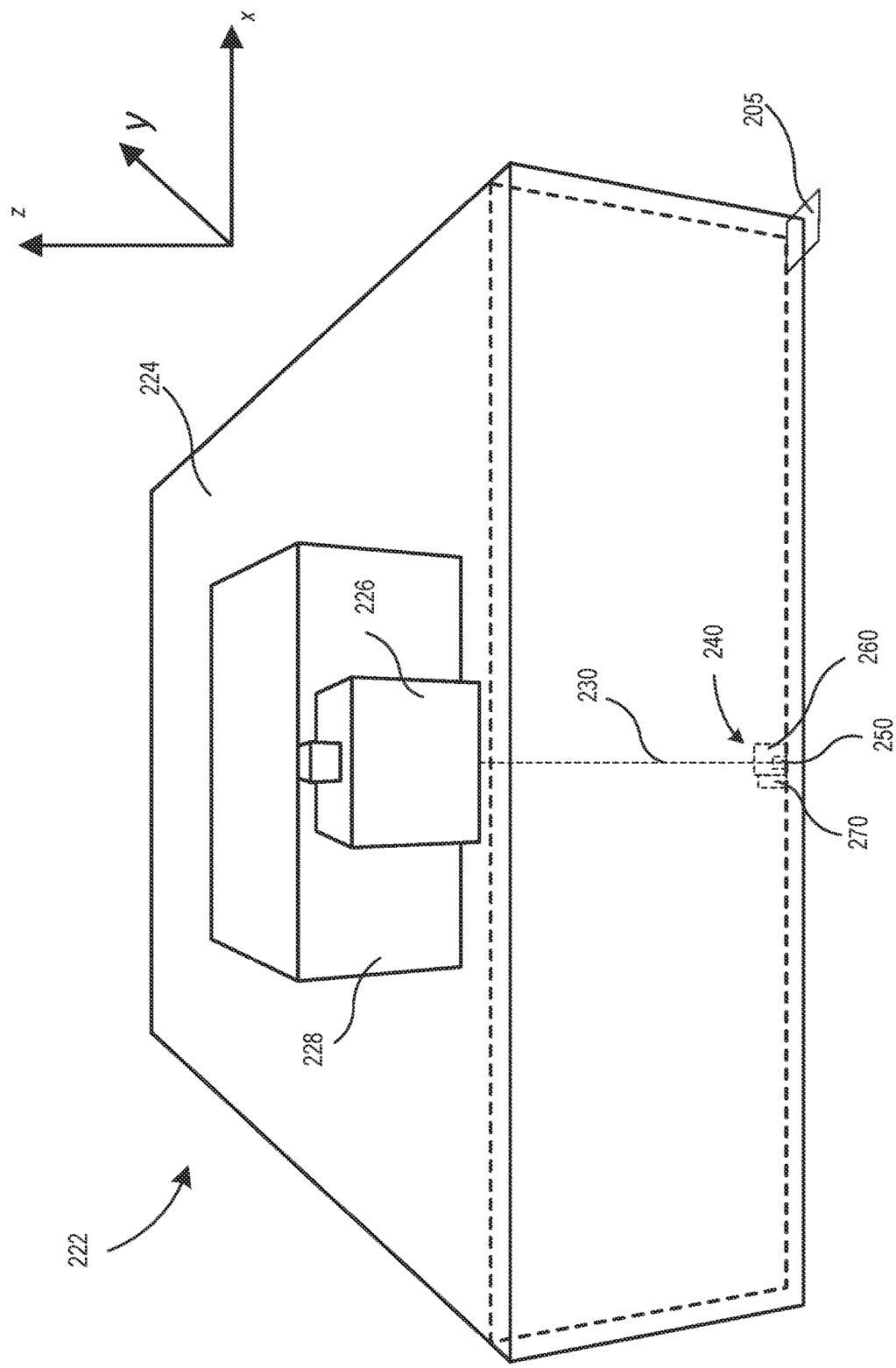
FIG. 2 is a perspective view of an example HAMR slider, in accordance with aspects of this disclosure.

FIG. 2 is a perspective view of an example HAMR slider 222 (e.g., a slider 122 of HDD 100 of FIG. 1), in accordance with aspects of this disclosure. Slider 222 includes a slider body 224, a laser 226, a submount 228, a waveguide 230, and a heat-assisted magnetic recording (HAMR) head 240. HAMR head 240 includes a near-field transducer (NFT) 250, writer(s) 260, and reader(s) 270. In the example of FIG. 2, some features, or parts of features of NFT 250, writer(s) 260, and reader(s) 270 (e.g., features such as a peg of NFT 250, a write pole of writer 260, a free layer and a pinned layer of reader 270), are presented on a media-facing air-bearing surface (ABS) 205 that is positioned over a surface of a magnetic disk (not shown) during some operations of the HDD. During such operations, ABS 205 faces and is held proximate to the moving magnetic disk surface by a cushion of gas, known as an active air bearing (AAB), that is produced from a dynamic flow of gas across a pattern of recessed sub-surfaces bound within the volume of slider body 224 by ABS 205.

Laser 226 is configured to emit photons of an approximate target wavelength. In some examples, laser 226 emits photons with an approximate wavelength in the near infrared range or visible range. In one example, laser 226 emits photons with an approximate target wavelength of 830 nm, qualifying laser 226 as a near infrared (NIR) source. Examples of laser 226 include an electrically pumped integrated semiconductor laser. Laser 226 of this example may be configured as an edge emitting laser (EEL), vertical cavity surface emitting laser (VCSEL), or other type of laser diode. Other example HAMR heads may include other types of light sources such as light emitting diodes (LEDs) and surface emitting diodes.

Laser 226 is coupled to slider body 224 via submount 228. In the example of FIG. 2, laser 226 and submount 228 are located on a face of slider body 224 which is opposite to ABS 205. In other example HAMR sliders, a laser may be directly mounted to the slider body. Submount 228 may be configured to redirect photon output from laser 226 so that it is directed into waveguide 230 in the negative z-direction of FIG. 2. The path between laser 226 and waveguide 230 may include one or more optical couplers, mode converters, and/or mode couplers. Waveguide 230 is formed integrally within slider body 224 and is configured to deliver photons from laser 226 to NFT 250.

NFT 250 is configured to generate and support a distribution of localized surface plasmons (LSPs) upon receiving incident photons from laser 226 by way of waveguide 230, condense the LSP distribution on an area or feature of NFT 250, and focus near-field energy of the LSP distribution on a spot on a surface of a magnetic disk (e.g., a magnetic disk 108 of FIG. 1). Writer 260 is configured to generate a magnetic field from an electrical current and aim the magnetic field at an area of the magnetic disk which includes the spot of focused near-field energy of the LSP distribution of NFT 250. The near-field energy of the LSP distribution heats and lowers the coercivity of the magnetic grains in the spot of focus, thereby enabling these magnetic grains to be preferentially oriented by the magnetic field of writer 260. Turning off laser 226 or moving NFT 250 toward a different location of the magnetic disk (or moving the magnetic disk such that NFT 250 faces a different location of the magnetic disk) removes the focused near-field energy from the spot on the magnetic disk, allowing the magnetic grains to cool and thereby locking in the preferred grain orientation, and thus bits of written data, induced by the magnetic field from writer 260. These steps of applying focused near-field energy to a surface of a magnetic disk, applying a magnetic field which is at least partially coincident with the near-field energy on the surface of the magnetic disk, ceasing the near-field energy and applied magnetic field, and cooling the surface of the magnetic disk describe, at a high level, the HAMR write operation.

The HAMR write operation, and more specifically the process of generating and sustaining LSPs on an NFT, may be accompanied by a temperature increase in a HAMR head and its associated features. A temperature increase in a HAMR head and/or one or more of its features may result from incident photons from a laser or other source which are not converted into LSPs and are lost through thermal excitation, scattering, and/or other non-resonant modes. Incident photon energy losses may reduce the efficiency of LSP generation and increase the laser power which is required to maintain the LSP distribution needed to heat the magnetic disk surface and lower the magnetic coercivity of the associated grains. Such an increase in laser power may increase the temperature of a HAMR head and/or one or more of its respective features. Particularly, misalignment between the laser 226 and the waveguide 230 may result in a significant portion of the optical energy being produced to be converted into excess heat in the slider 222. Excess heat may be detrimental in reducing longevity of slider functioning and requiring higher laser output in order to achieve the same level of media heating.

Figure 3:
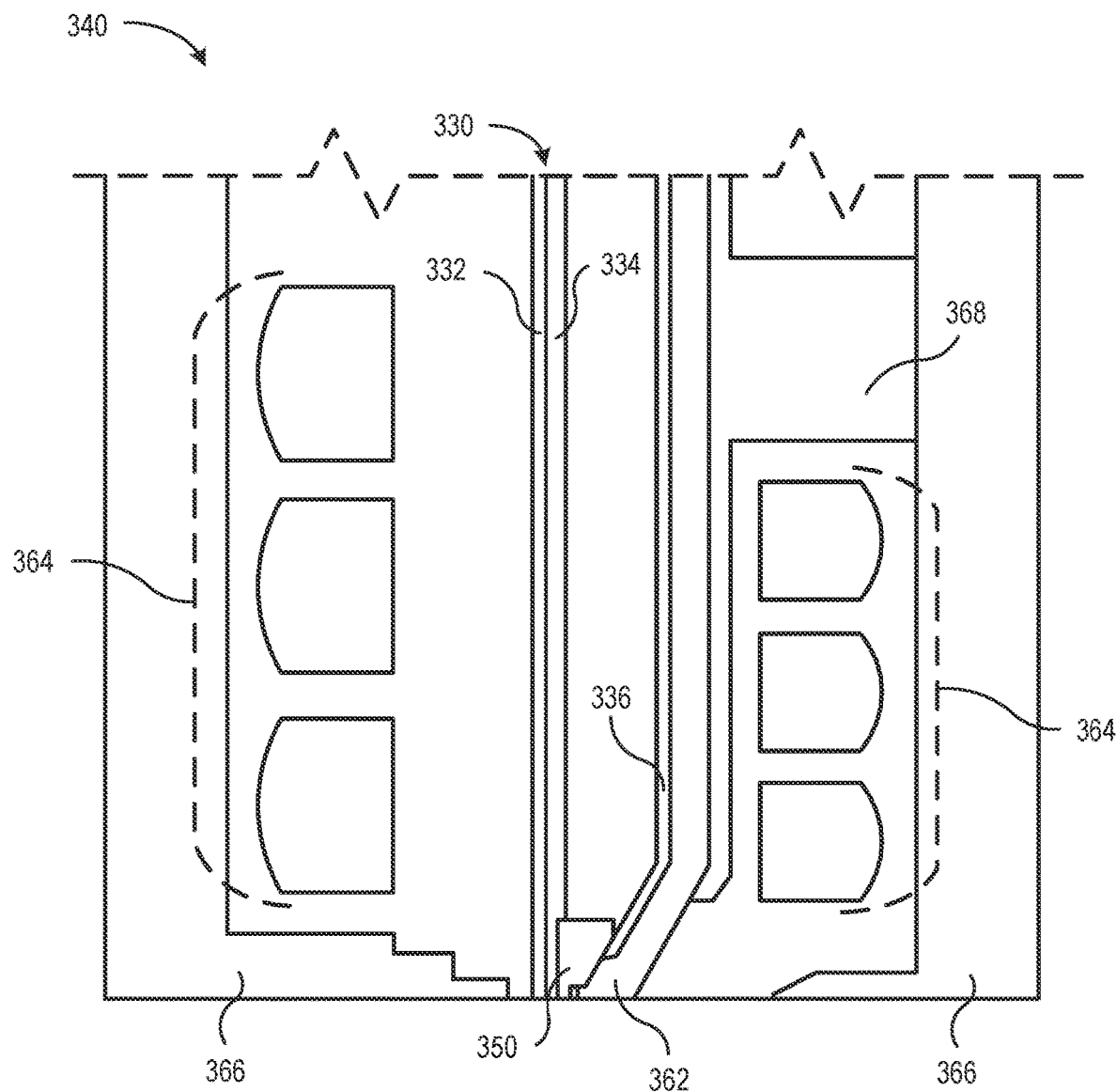
FIG. 3 is a cross-sectional view an example HAMR head, in accordance with aspects of this disclosure.

Referring now to FIG. 3, there is shown a cross-sectional view of an example HAMR head, in accordance with aspects of this disclosure. HAMR head 340 includes a waveguide 330, an NFT 350, a diffuser 336, a write pole 362, writer coils 364, return poles 366, and a yoke/via structure 368.

In an example HAMR HDD, a drive controller may output an electrical current through writer coils 364, which are configured to carry the electrical current and induce a magnetic field in write pole 362. Write pole 362 is configured to direct the magnetic field produced by writer coils 364 toward a surface of a magnetic disk to preferably orient grains of the magnetic disk into bits of data which are stored for later retrieval. An example magnetic field induced in write pole 362 may be directed toward and focused on an area external to HAMR head 340, such as an area on a surface of a magnetic disk, and returned to HAMR head 340 through return pole(s) 366. The magnetic field which returns to recording HAMR 340 through return pole(s) 366 may then be directed back to write pole 362 through a channel such as yoke/via structure 368.

NFT 350 is configured to support the generation of LSPs and focus near-field energy of the LSP distribution on a surface of a magnetic disk. NFT 350 may, in some examples, be located proximate to waveguide 330. NFT 350 of this example is physically coupled to waveguide 330 and diffuser 336. In some examples, a laser, such as laser 226 of FIG. 2, emits photons of an approximate wavelength which are directed toward NFT 350 by waveguide 330. Waveguide 330 is configured to transmit photons from a light source (e.g., laser 226 of FIG. 2) toward NFT 350 and couple the transmitted photons to a feature or features of NFT 350 in order to generate LSPs through resonance coupling of the photons with free electrons of NFT 350. In some examples, waveguide 330 is configured as a planar waveguide or channel waveguide. Waveguide 330 may include dielectric materials (e.g., aluminum oxide, silicon dioxide, niobium oxide).

Example HAMR head features (e.g., NFTs, NFT features such as pegs and disks, heat sink structures, miniature solid immersion mirrors) often comprise plasmonic metals. As used herein, a plasmonic metal is a metal which possess properties (e.g., electrical properties, optical properties) which promote resonance coupling between photons incident upon the plasmonic metal and free electrons of the plasmonic metal. Such resonant coupling of a photon with free electrons of the plasmonic metal may excite one or more plasmonic modes of the plasmonic metal, which may result in the generation of an LSP on a surface of the plasmonic metal. Examples of plasmonic metals include gold, silver, ruthenium, copper, aluminum, rhodium, and combinations thereof.

Waveguide 330 may include dimensions and features which shift the momentum vector (e.g., the k vector) of the incident photons from a laser or other light source so that a component of the k vector of an incident photon of a given frequency (e.g., ω) which is parallel to a waveguide 330/NFT 350 interface matches the momentum vector k of an associated LSP mode of the given frequency ω. In one example, a waveguide includes gratings with periodic patterns which can shift (e.g., increase) a momentum of an incident photon. In other examples, a waveguide includes multiple layers of materials of different refractive indices, where a momentum of an incident photon in a first material of a first refractive index is shifted upon transmission into a second material of a second refractive index. Waveguide 330, for example, includes a waveguide core 332 and a core-to-NFT spacing (CNS) layer 334. Waveguide core 332 may include a first dielectric material (e.g., niobium oxide) of a first refractive index, and CNS layer 334 may include a second dielectric material (e.g., aluminum oxide, silicon dioxide) of a second refractive index. Such features and structures of waveguide 330 may, in some scenarios, manipulate a momentum component of an incident photon from a laser or other light source and match the momentum component to a momentum component of a surface plasmon mode of NFT 350 such that photons directed by waveguide 330 may couple to free electrons of NFT 350 and excite one or more LSP resonance modes.

Diffuser 336 of FIG. 3 is a heat sink structure which is configured to draw heat generated by the HAMR process away from NFT 350, write pole 362, and other features of HAMR head 340, and dissipate the heat toward other, less thermally sensitive areas of HAMR head 340 and its associated slider. In some examples, diffuser 336 is part of a larger heat sink structure of HAMR head 340. Diffuser 336 may include a plasmonic metal, and in some instances includes the same plasmonic metal or metals that are included in NFT 350.

Heat sink structures such as diffuser 336 and the NFT 350 may be prone to thermally-induced defects. For example, they may exhibit deformation, voiding, shrinkage, and/or delamination from surrounding interfaces (e.g., the diffuser 336/write pole 362 interface). Misalignment of the laser with the waveguide 330 may decrease the efficiency of the HAMR slider's transference of energy to the media. As such, the laser power may need to be increased in order to compensate for the reduced efficiency. Increasing laser power over extended period of times reduces reliability of laser itself, as well as results in more heat generation in the slider, potentially resulting in more thermal degradation in components that are susceptible to such damage. It is therefore desirable to maximize laser light coupling to the waveguide 330, both from an energy consumption standpoint, and from a thermal stability standpoint.

Figure 4:
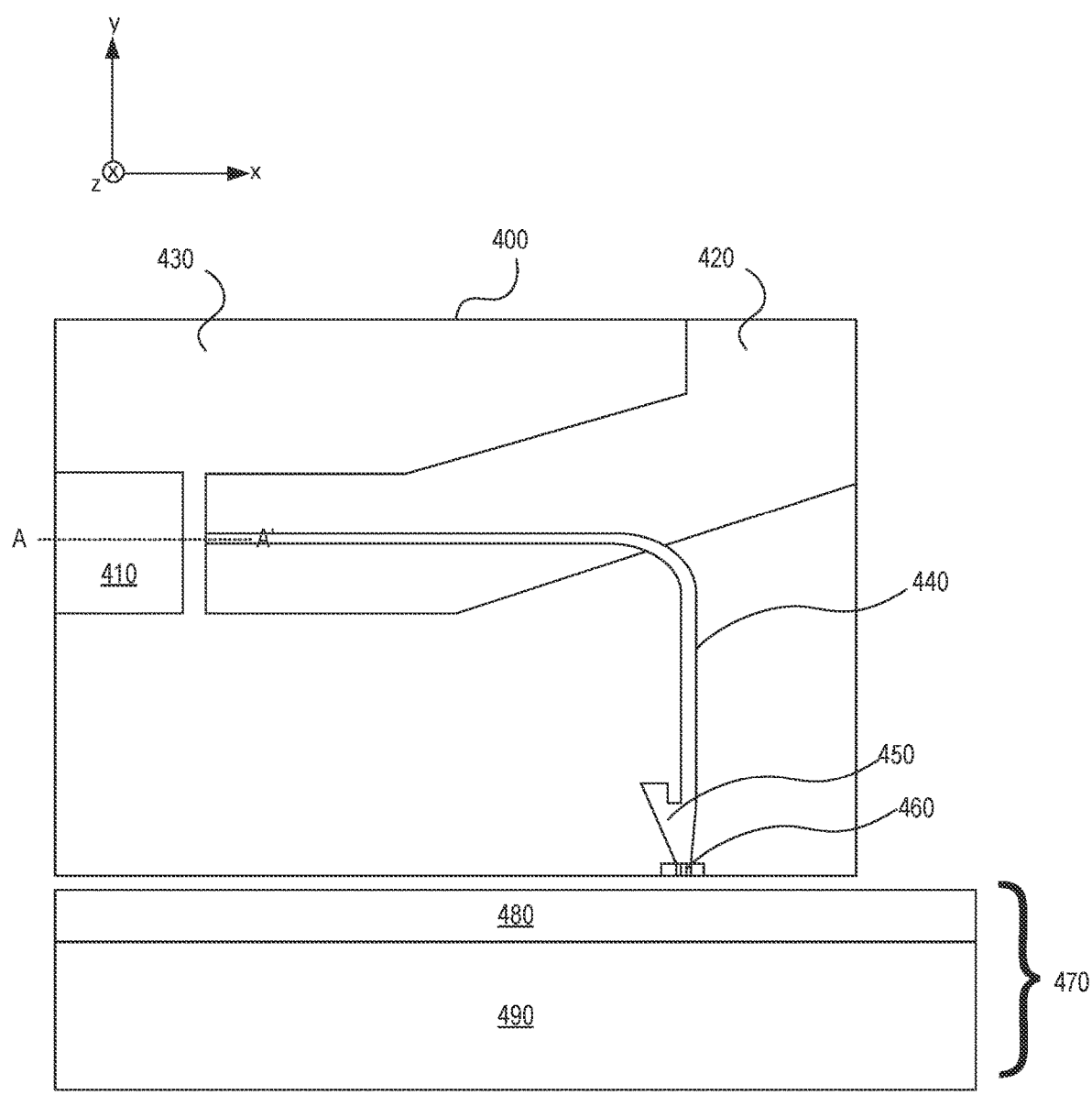
FIG. 4 is top-down view of an example HAMR slider, in accordance with aspects of this disclosure.

Turning to FIG. 4, a top-down view of an example HAMR slider 400 is provided in relation to a recording media 470. This traditional slider design includes five distinct components. Each of these components are subject to alignment and integration difficulties. In some aspects, the recording media 470 includes a magnetic recording layer 480 deposited upon an underlying substrate 490. Substrate 490 is a self-supporting substrate, meaning that it has mechanical integrity sufficient to permit handling of the substrate without undue breakage or other damage.

The slider 400 includes a knife coupler 420, which couples light that is generated by the laser 410 to a waveguide 440. The knife coupler 420, waveguide 440 and laser 410 are mounted on a slider substrate 430. The waveguide 440 terminates in a mode converter 450 and the NFT 460.

The waveguide 440 includes a first segment adjacent to the laser 410, a second segment adjacent to NFT 460, and a third segment disposed between first segment and second segment which curves to orient the laser light from a direction substantially parallel to the media face to substantially orthogonal to the media face. For the purposes of this disclosure, the terms "substantially" may indicate a deviation from the stated range by 10% or less, while the term "about" may indicate a deviation of 25% or less. The term "approximately" may indicate a deviation of 50% or less. Further, in the context of the present disclosure, the term "adjacent" may imply physical contact or near, but not in physical contact (e.g., separated by a gap). The first segment of the waveguide 440 includes a first end that is adjacent to laser 410. In some examples, first segment is substantially parallel to a media-facing surface of the HAMR head. The first segment is coupled to the knife coupler 420 that is configured to direct electromagnetic radiation emitted by the laser 410 into the waveguide 440. The coupler 420 of the HAMR head 400 has a rectangular portion proximal to the laser 410 and a second portion that tapers away from the laser 410. Other shapes and geometries of the coupler 420 are contemplated (e.g., circular geometries, geometries having curved and/or straight legs and/or branches). The knife coupler 420 may include a material (e.g., a dielectric material) having a different (e.g., lower) refractive index than the waveguide 440.

The second segment of the waveguide 440 includes a second end that is adjacent to NFT 460. In some examples, the second segment is substantially orthogonal to media-facing surface. The second segment may include a mode converter 450. The mode converter 450 is a branch of the waveguide 440 that is configured to convert an optical mode of electromagnetic radiation that is emitted by laser 410 (e.g., a transverse electric mode to a transverse magnetic mode, a first transverse electric mode to a second transverse electric mode).

It should be noted that coupler 420, and mode converter 450 are optional and in no way required for successful operation of HAMR 400 and the features described herein. These features may be components that are used for particular configurations of the HAMR head 400 (e.g., particular configurations of laser 410 (e.g., emission wavelengths) and/or particular configurations (e.g., geometries) of NFT 460). Thus, while a particular embodiment of a HAMR head 400 is illustrated herein, it should be understood that some, in any combination, of the above features may be omitted in any particular substantiation of the HAMR head 400.

This illustrated HAMR slider includes a laser diode 410 that is transfer printed to the slider 400. In some examples, laser diodes 410 may be fully operational laser diodes. In other examples, laser diodes 410 may be partially manufactured laser diodes. Partially manufactured laser diodes may undergo subsequent processing steps after a transfer printing process to become fully operational. A reference line between A and A' is illustrated for the cross-sectional view of FIG. 5.

Figure 5:
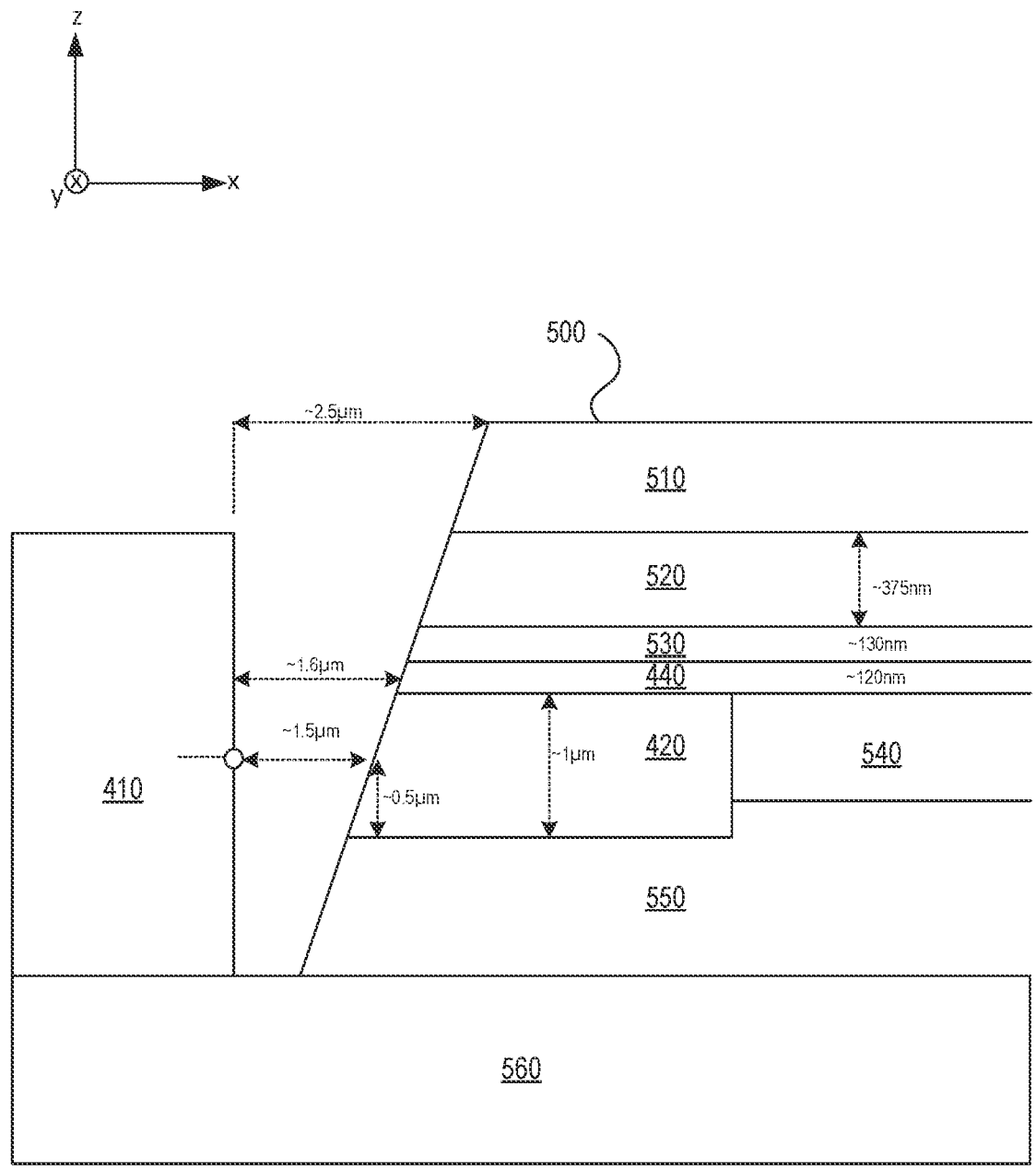
FIG. 5 is a cross sectional view of an example HAMR laser and waveguide, in accordance with aspects of this disclosure.

Turning to FIG. 5, this cross-sectional view of an example HAMR laser 410 and waveguide 440 is illustrated. This illustration is of a traditional HAMR slider design, which suffers from misalignment issues of the laser 410 and the waveguide 440. The laser 410 is shown including an emission point. This emission point is generally approximately 0.5 um below the waveguide layer 440. A trench is located between the laser 410 and the waveguide structure 500. This trench enables the light emitted from the laser 410 to be directed into the waveguide 440 and knife coupler 420 and subsequently to the NFT (not illustrated in this figure).

The laser 410 and the waveguide structure 500 are transfer printed upon a slider substrate 560. Above, referencing the z direction, the substrate 560 there are multiple shielding layers (collectively 550). These shielding layers 550 form an integral part of the slider reader and writer elements. Proximal to the shielding layers 550 is a portion of the knife coupler 420 and an additional coupling layer 540. The coupling layers 420 and 540 include optical materials, such as for example Silicon-oxy-Nitride (SiONx) or Aluminum oxide (AlOx) for 420 and Silicon-di-oxide (SiOx) layers for 550.

The waveguide 440 may comprise Niobium oxide ($NbO_x$). An optical alumina oxide ($AlO_x$) layer 530 is deposited above, relative to the z axis, the waveguide 440. A top coupling layer 520 is proximal to the $AlO_x$ layer 530. Although the emission point is shown as a discrete point on the center of the laser diode 410, the actual optical field is rather large. Thus, the coupling layers collect the laser light and direct it to the waveguide 440 for transfer to the NFT.

Proximal to the top layer 520 are additional non-optical layers, including one or more yoke layers (collectively 510). The laser 410 emission point, with respect to the waveguide structure 500 needs to be finely tuned in order to get optimal transference of the optical energy from the laser 410 to the NFT via the waveguide 440. This may be problematic in that the laser 410 is deposited on the substrate 560 via a transfer print process. During this transfer print, it is possible to get misalignments in the x, y and z directions. Misalignments cause, at a minimum, lower coupling efficiency, and at a maximum results in a failure (yield loss). As noted, lower coupling efficiency means that the laser is driven at a higher energy level to achieve the same degree of optical energy being delivered to the NFT. Running the laser at higher power is both energy inefficient, and also results in excess heat. As noted, excess heat may cause degradation to the heatsink, NFT, and other heat sensitive components of the slider. As such, increasing coupling efficiency, along with less variation of coupling efficiency between one head to another is highly desirable.

Figure 6:
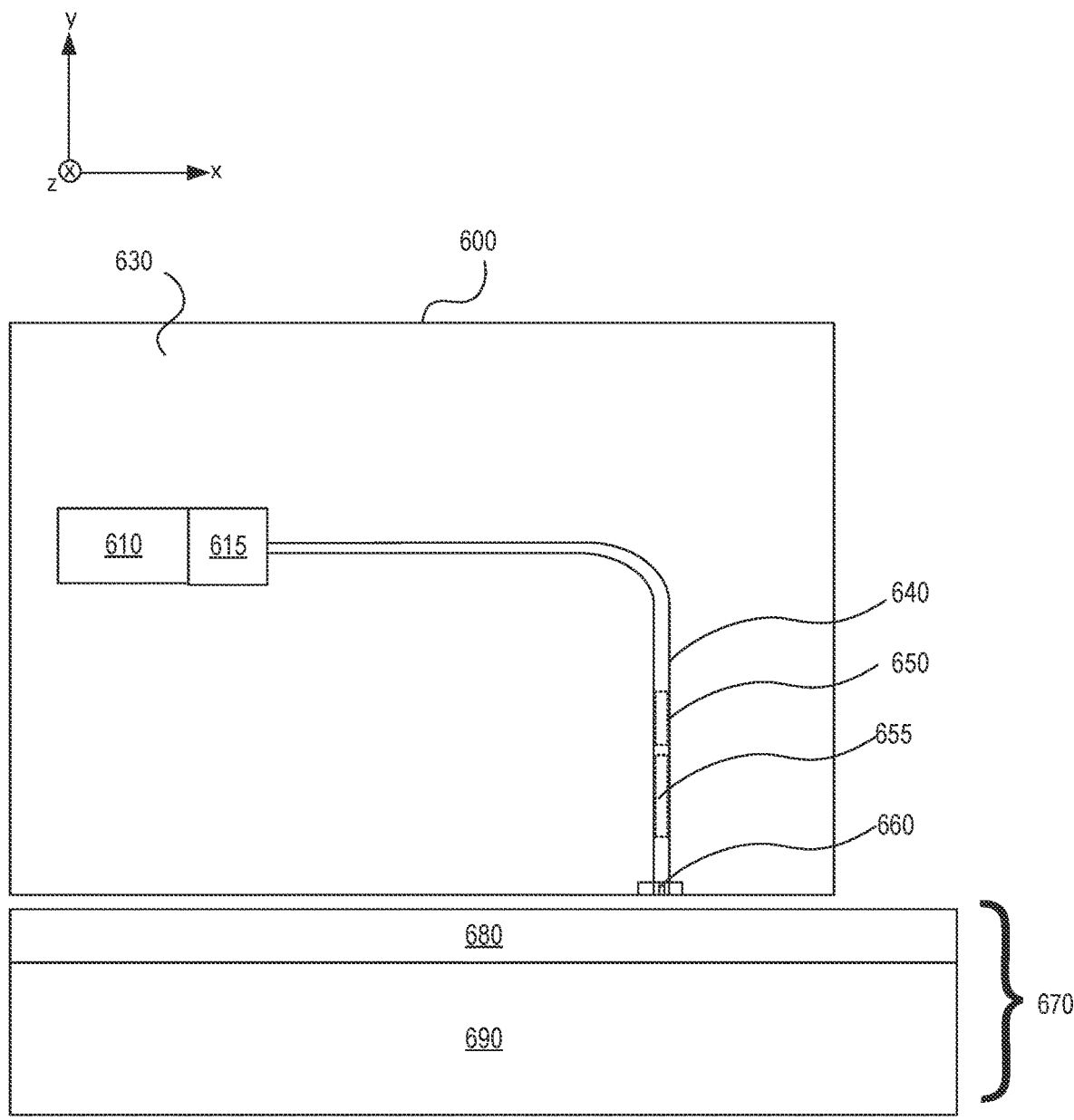
FIG. 6 is top-down view of an example HAMR slider, in accordance with aspects of this disclosure.

Turning to FIG. 6, a top-down view of an improved example HAMR slider 600 with an integrated heterogeneous active layer is provided. In this embodiment, the laser active layer 610 is deposited or transfer printed directly onto the waveguide 640. An optional reflector 655 (which ideally may take the form of a Bragg reflector), and an optional mode converter 650 may be integrated directly into the waveguide 640. The waveguide 640 terminates into the NFT 660 for conveyance of the electromagnetic energy from the active layer 610 to the media surface 680. As before, the media 670 constitutes a surface layer 680 over a substrate 690.

In this example illustration, an integrated coupler 615 assists in conveyance of the electromagnetic energy from the active layer 610 to the waveguide 640. As the active layer and coupler 615 are integrated adjacent to, and ideally coupled to the waveguide 640, the coupling efficiency is dramatically improved over a design where the laser is transfer printed into the trench, as was illustrated in FIGS. 4 and 5. Indeed, the coupling efficiency of this design may exceed 90%. Since the transfer print is directly on the waveguide, photolithography markers can be utilized for laser transfer print or process laser facets in the shape of the coupler after transfer print. This completely mitigates x,y and z alignment variation issues. Hence, the coupling efficiency variation between head-to-head is also significantly reduced. Due to this very high coupling efficiency and reduced coupling efficiency variation between heads, laser power may be dramatically reduced, thereby saving significant energy saving gains, and importantly lower heat generation.

In the present design, the entire complex of the active layer 610, the coupling facet 615 the waveguide 640, mode converter 650 and the reflector 655, behaves as one standalone laser (also know as external-cavity laser) since their interface reflection is negligible. Since the distance of reflector 655 from NFT 660 is controllable, it can be designed in a way as to cancel out the effect of external feedback from NFT 660 (and media 670). Hence, a major benefit of laser integrated in this fashion is that NFT back reflection is independent of laser instability or laser power fluctuation (LPV), even in the event that NFT degrades over time. In contrast to FIG. 6, FIGS. 4 and 5 had separate laser with reflective facet in the trench. Hence external reflection from NFT causes laser instability. However, with FIG. 6, distance between reflector 655 and NFT 660 is designed in such a way that the external reflection effect is completely mitigated. Hence there is no laser instability or LPV.

Figure 7A:
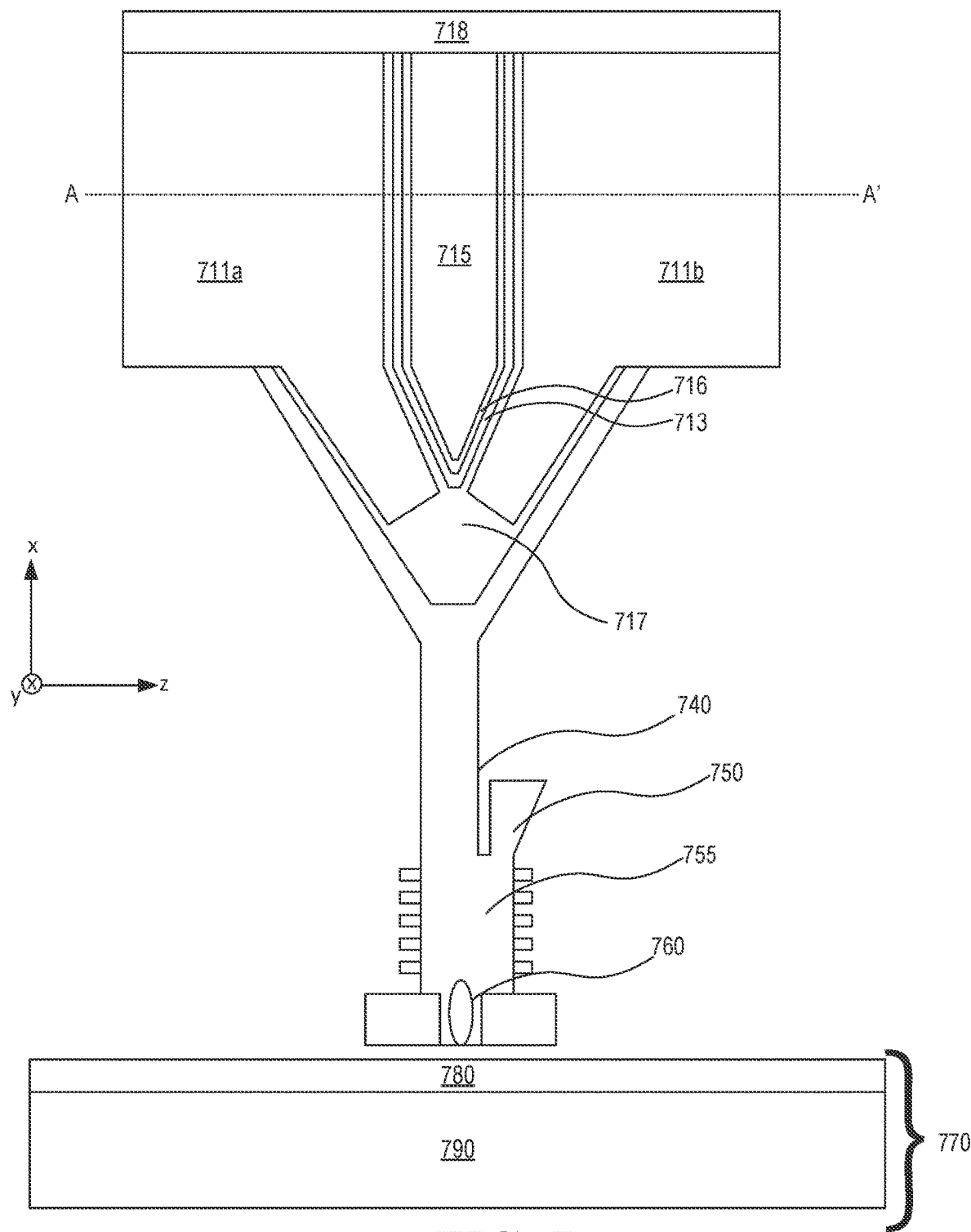
FIGS. 7A and 7B are top-down view of example HAMR sliders with integrated active layers, in accordance with aspects of this disclosure.
Figure 7B:
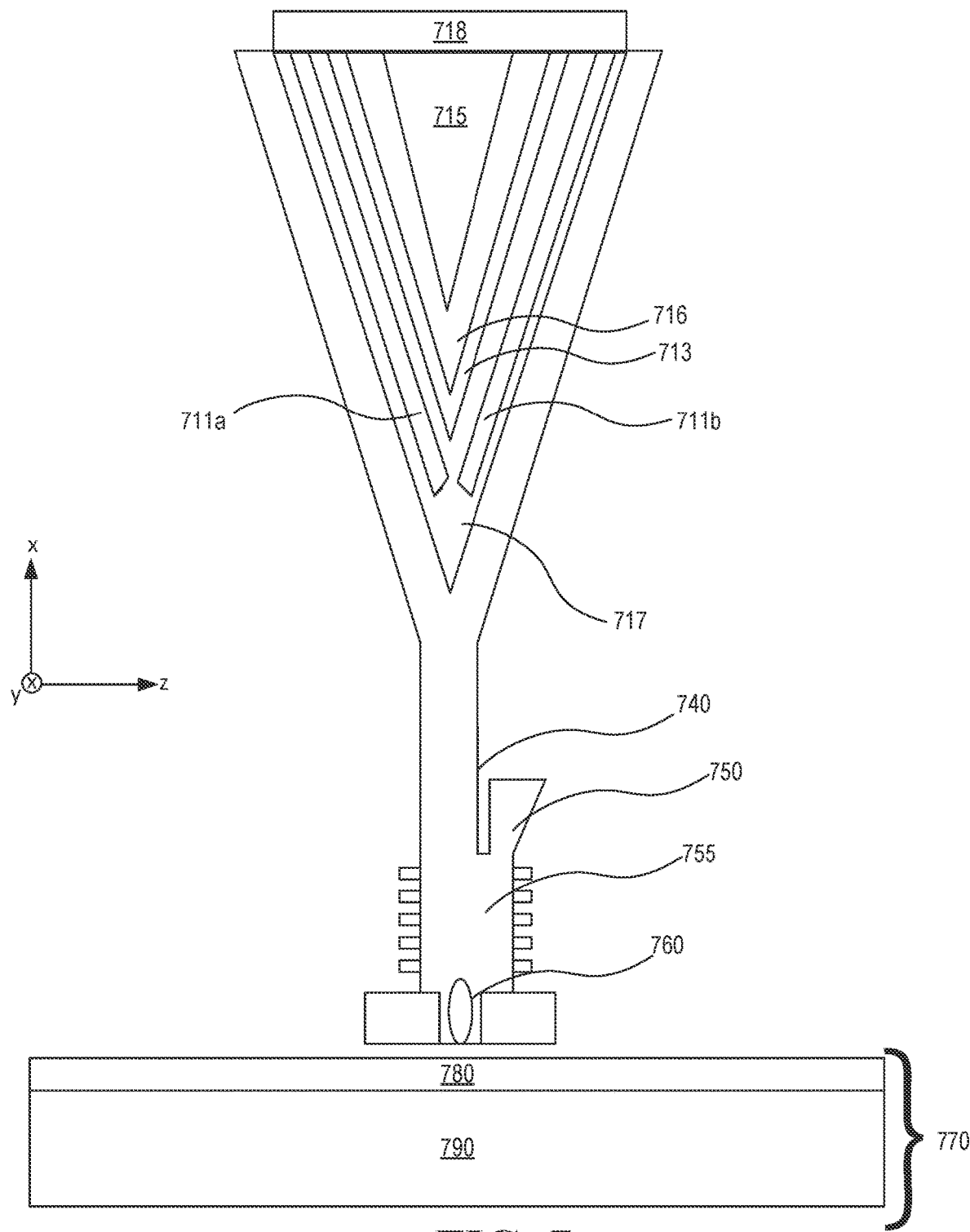

FIGS. 7A and 7B are top-down view of example HAMR sliders with an integrated active layer, in accordance with aspects of this disclosure. In these embodiments the waveguide 740 can be seen extending from the laser structure down to the NFT 760. The waveguide 740 in some embodiments may consist of $Nb_2O_5$, GaP, AlGaAS, $Ta_2O_5$, GaN, AlGaN, some combination thereof, or any material that is optically transparent at wavelengths of approximately 830 nm. The mode converter 750 and reflector 755 (typically a Bragg reflector) are optional components along the waveguide 740 structure.

The laser device includes a long N-doped layer(s) 717, active layers 713 and a P-doped layer(s) 716. The tapered structure acts as a coupling facet. In some embodiments, the taper extends the entire length of the active layer 713 to the back facet 718, as seen in FIG. 7B. In other embodiments, the taper portion is only a portion of the device length, as seen in FIG. 7A. The N-doped layer needs to be relatively thin, on the order of about 150 nm to 300 nm in thickness, in order to be an effective coupler between the active layer 713 and the waveguide 740. In some embodiments the tapered portion of the N-doped layer extends about less than 100 µm in the x-axis. In another embodiment, the tapered portion of the N-Doped layer is about 100-200 um in length along the x-axis. In some embodiments, the N-doped layer 717 is an N-doped gallium arsenide, indium gallium arsenide alloy and/or aluminum gallium arsenide alloy. The N-doped layer 717 is coupled to electrodes 711a and 711b. 711a and 711b are electrically connected (not shown). The electrodes 711a and 711b are a metal or metal alloy. In some embodiments, a gold alloy may be utilized for the electrodes 711a and 711b.

Over the N-doped layer 717 are the active layers 713. A super-lattice (not illustrated) and bonding layer below the N-doped layer 717 prevents defects from propagating to the active layers 713. In some embodiments, the active layers 713 consists of Multiple Quantum Wells (MQWs), SCH and p-doped and n-doped SCH layers. Again, the active layer 713 extends along the waveguide 740 in a tapered geometry in order to effectuate coupling of the generated electromagnetic radiation from the active layer 713 to the waveguide 740 and eventually the NFT 760. The tapered portion of the active layer may be about less than 60 µm in length along the x-axis. In some embodiments, the active layer is about between 100-300 nm in thickness along Y-axis, and when excited by a current, produces electromagnetic radiation at about 830 nm for a GaAs active layer and about 1550 nm for an AlGaInAsP active layer.

Proximal to the active layer 713 is a P-Doped layer 716. The P-doped layer 716 is also tapered along the x-axis, and extends the same amount, or less than, the active layer 713. In some embodiments, the P-doped layer 716 is a P-doped gallium arsenide, indium gallium arsenide, and/or aluminum gallium arsenide. The P-doped layer 716 is coupled to at least one electrode 715. The electrode 715 is a metal or metal alloy. In some embodiments, a gold alloy may be utilized for the electrode 715. At the rear, in the x-direction, of the laser structure is a back facet 718. The back facet 718 is designed to include multiple layers (for example alternating Al2O3 and SiO2 layers) for high reflection. In some embodiments, the width of the active layers and P-doped layers at the back facet, in the z-direction may extend to a width of about less than 20 µm in the z-direction.

It should be noted that the laser structure displayed in FIG. 7A or 7B is not the limit of the possible geometries. In some embodiments, for example, the entire laser structure may be a long, tapered geometry. In another example structure, the shape of the laser structure may be a long box-like structure, substantially parallel to the x-axis, and ending in a shorter tapered region along the x-axis. Generally, as long as there is a tapered coupling facet, and the proper layers present (at the requisite thicknesses), the laser device will be properly integrated in order to generate the proper electromagnetic radiation that is directed with a high coupling efficiency to the waveguide 740.

In some embodiments, the various layers of the laser may include the growth of an epitaxial layer or stack on a donor substrate, patterning of the epitaxial layer or stack on the donor substrate, transfer of the patterned epitaxial layer or stack from the donor to a wafer on which HAMR head 230 is being fabricated (e.g., a wafer that includes some components of HAMR head 230 that have already been fabricated), and further processing of the epitaxial layer or stack to form the final profile and features of the laser.

Figure 8:
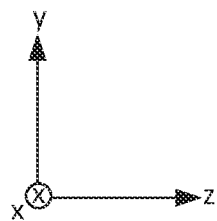
FIGS. 8 and 9 are cross sectional views of example HAMR sliders with an integrated active layer, in accordance with aspects of this disclosure.
Figure 8:
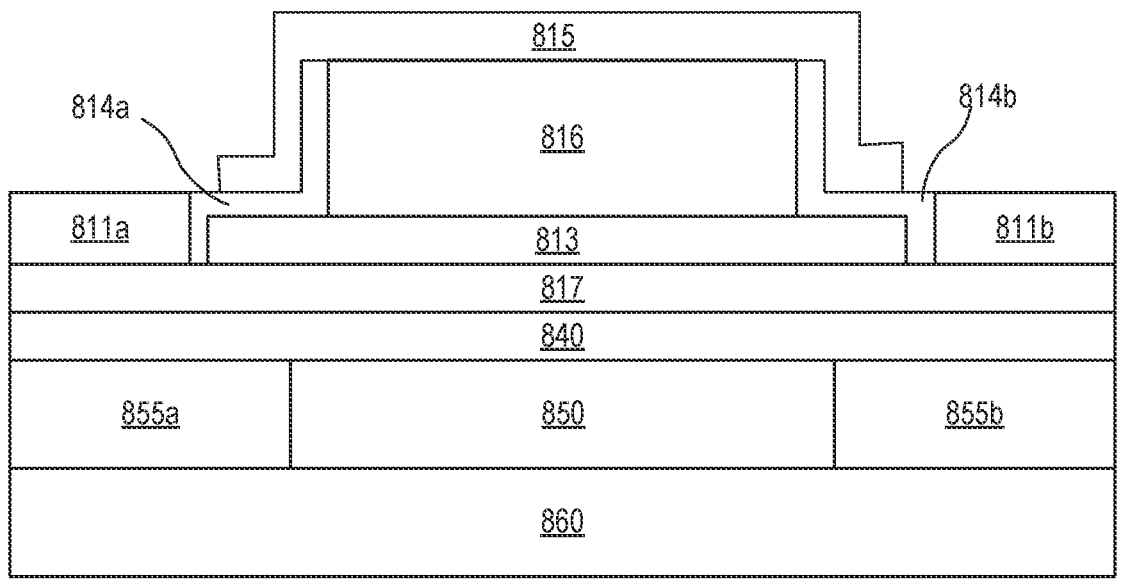

FIG. 8 is a first cross-sectional view of example HAMR sliders with an integrated active layer along the line indicated as A to A' on FIG. 7A, in accordance with aspects of this disclosure. In some embodiments, a base substrate layer 860 of the slider may be present. The substrate may include a AlTiC (Aluminum-Titanium-Carbon) substrate, or any substrate capable of providing mechanical stability to the layers above it in the y-direction. Proximal to the substrate in one or more heatsink structures 855a and 855b. These heatsinks 855a and 855b may be metallic materials that are capable of conducting heat away from the laser structure. Even though coupling efficiency is high for this kind of laser device, removal of excess heat is beneficial to protect sensitive components and improve device longevity. In some embodiments, an additional heatsink may be located above the laser device in the y-direction; however, this alternative or additional heatsink is not illustrated for clarity's sake.

Proximal to the heatsinks 855a and 855b is a dielectric material, such as Aluminum oxide (AlOx) or Silicon-dioxide (SiOx). Above the heatsinks 855a and 855b, is the waveguide 840 structure. This may be the same waveguide structure as seen at part 740 of FIG. 7. Again, the waveguide may direct the electromagnetic energy from the laser layers to the NFT (optionally through a mode converter and reflector, which are not illustrated in the present figure). Above the waveguide in the y-direction is the N-doped layer 817, which may be the same as the N-doped layer found in FIG. 7. Not illustrated, it is possible to have an N—GaAs cap layer above the N-doped layer 817 in the y-direction. Also, above the N-doped layer 817 are at least one contacts 811a and 811b. As noted, the contacts 811a and 811b are metallic alloy, such as Au—Pd—Pt—Ti for P-metals and Au—Ge—Ni for N-metals. In other embodiments, the Zn or Be may be added for N-metals. Over the N-doped layer 817, in the y-direction, is the active layer 813. The active layer may be the same as active layer 713 of FIG. 7. Likewise, over the active layer 813, in the y-direction, is the P-doped layer 816. The P-doped layer may be the same as P-doped layer 716 of FIG. 7.

Silicon oxide or another dielectric layer 814a and 814b may be deposited over the P-doped layer. This dielectric layer 814a and 814b prevents the top contact 815 from coupling to any layer except the P-doped layer 816. The top contact 815 is a metallic contact similar to contacts 811a and 811b. In addition to providing electrical insulation between the contact 815 and any unintended layers, the dielectric layer 814a and 814b provides a stress reduction of the laser component. Bowing is a common issue with the laser device, and by providing a stiffening member (in the form of the dielectric layer 814a and 814b), this deformation may be minimized.

When current is run through the laser device from contacts 811a and 811b to contact 815, there is excitation of the active layer. This generates electromagnetic radiation. In some embodiments, this radiation is within about 830 nm in frequency. The electromagnetic radiation propagates along the tapered end of the N-doped layer and migrates into the waveguide with a high degree of coupling efficiency. The radiation is then ultimately conveyed to the NFT.

Figure 9:
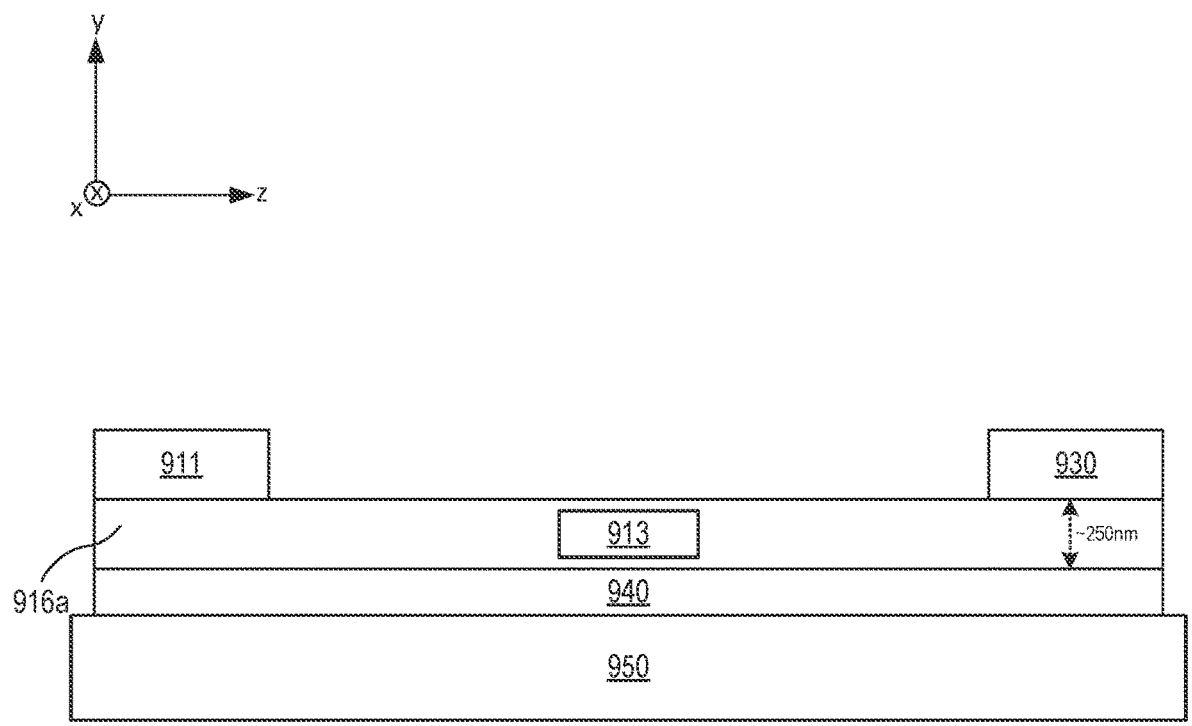

FIG. 9 provides another embodiment of the laser device, in accordance with some embodiments. This example the device is made even thinner, on the order of only about 250 nm in thickness. Such a thin membrane laser may increase efficiency even further due to the high confinement of the optical fields in the MQW. This may enable even shorter coupler lengths of less than about 50 μm. In this example laser device, the substrate 950 is shown. Over the substrate may exist one or more heatsinks (not illustrated). Upon the substrate 950 (or heatsinks) is the waveguide layer 940. This waveguide 940 may have similar properties and/or compositions as the waveguide shown in FIG. 7.

Directly proximal to the waveguide 940 is a laser layer 916a that includes an N-doped portion on one side, in the z-direction, and a P-doped portion on the opposite end in the z-direction. Between the two regions is located the MQW core 913. Contacts 911 and 930 are located above the N-doped and P-doped regions, respectively. Generally, the N-doped and P-doped regions transition abruptly at the MQW core 913. However, in practice, there is often some degree of diffusion between these two regions near their boundary with one another.

By having such a thin emitter located in direct contact with the waveguide, the laser geometry may be rectangular (when viewed from the y-direction), or may include more exotic shapes, including tapered designs.

Figure 10:
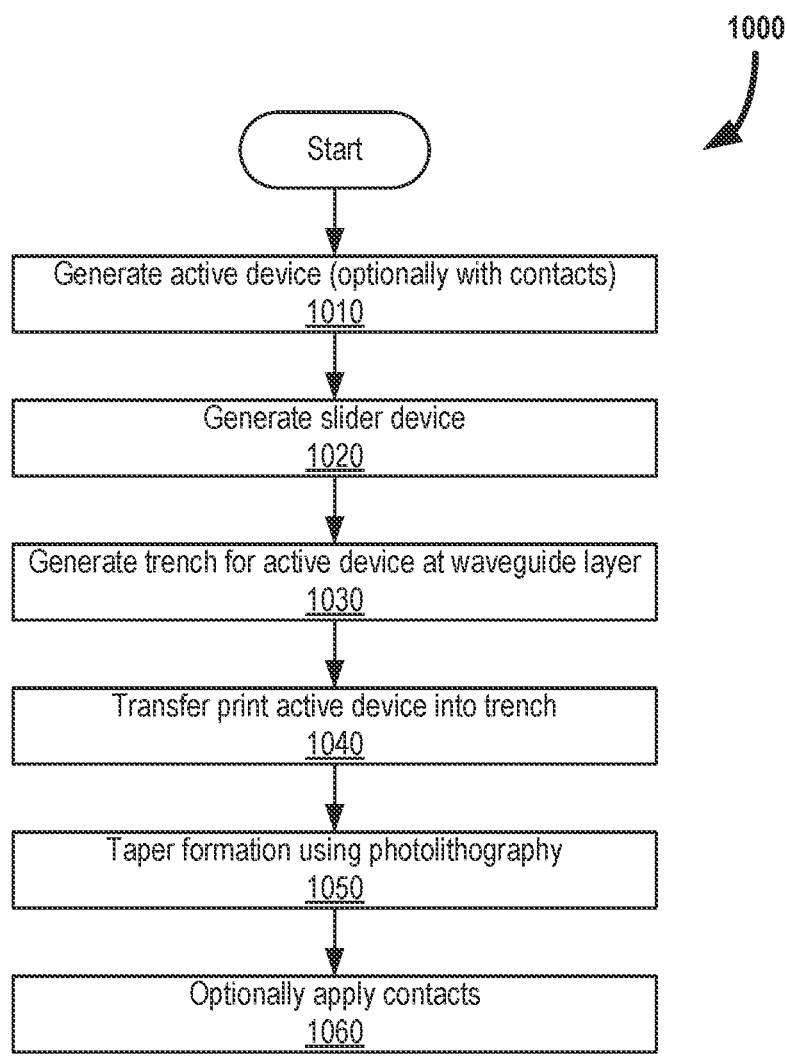
FIG. 10 is a flow diagram for an example process of generating a HAMR slider with an integrated active layer, in accordance with aspects of this disclosure.

FIG. 10 is a flow diagram for an example process 1000 of generating a HAMR slider with an integrated active layer, in accordance with aspects of this disclosure. Initially, an active device (with or without contacts and optionally with taper) is generated (at step 1010). Similarly, a slider device is generated (at step 1020)). A trench is generated in the slider device for the placement of the active device (at step 1030). This trench is generated proximal to the waveguide.

The active device includes the N-doped layer, active layers and P-doped layer. The active device is then transfer printed to the trench (at 1040) using known transfer printing techniques. Optionally, taper is formed in the active device using photolithography techniques (at step 1050) or transfer printed using photolithography markers to align taper to the waveguide. The taper acts as a coupling facet for transference of electromagnetic radiation from the active layer of the active device to the waveguide. Optionally contacts may then be applied (at step 1060).

While this invention has been described in terms of several embodiments, there are alterations, modifications, permutations, and substitute equivalents, which fall within the scope of this invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A waveguide assembly with an integrated active layer comprising:
   a waveguide disposed on a read-layer stack;
   an active layer consisting of an N-doped layer disposed proximal and integrated into a waveguide; and
   a near field transducer coupled to the waveguide, wherein the near field transducer is configured to generate and support a distribution of localized surface plasmons.

2. The waveguide assembly of claim 1, further comprising a coupling facet coupled to the active layer.

3. The waveguide assembly of claim 1, further comprising a mode converter coupled to the waveguide.

4. The waveguide assembly of claim 1, further comprising a reflector coupled to the waveguide.

5. The waveguide assembly of claim 4, wherein the reflector is a Bragg reflector.

6. The waveguide assembly of claim 1, the N-doped layer is an epitaxial layer.

7. The waveguide assembly of claim 1, wherein the waveguide extends in an axial direction.

8. The waveguide assembly of claim 7, wherein the active layer is tapered along the axial direction, and wherein the taper is less than approximately 200 um.

9. The waveguide assembly of claim 1, wherein the active layer is a GaAS laser.

10. The waveguide assembly of claim 1, wherein the active layer is a thin membrane laser approximately 250 nm in thickness.

\* \* \* \* \*